United States Patent
Singh et al.

(10) Patent No.: US 9,494,408 B2
(45) Date of Patent: Nov. 15, 2016

(54) HARDWARE-ONLY CONTACTLESS POSITION SENSOR SYSTEM

(71) Applicant: Rosemount Aerospace, Inc., Burnsville, MN (US)

(72) Inventors: Donald R. Singh, Apple Valley, MN (US); James Joseph McTighe, Burnsville, MN (US)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 193 days.

(21) Appl. No.: 14/177,541

(22) Filed: Feb. 11, 2014

(65) Prior Publication Data

US 2015/0109001 A1  Apr. 23, 2015

Related U.S. Application Data

(60) Provisional application No. 61/894,086, filed on Oct. 22, 2013.

(51) Int. Cl.
*G01B 7/00* (2006.01)
*G01D 5/20* (2006.01)

(52) U.S. Cl.
CPC ............ *G01B 7/003* (2013.01); *G01D 5/2046* (2013.01)

(58) Field of Classification Search
USPC ................. 324/654, 655, 656, 657, 207.15, 324/207.25, 202, 207.22, 207.16, 228, 233, 324/239, 241, 262, 326, 345; 318/661; 702/151, 150, 96; 329/345
See application file for complete search history.

(56) References Cited

U.S. PATENT DOCUMENTS

| | | | |
|---|---|---|---|
| 6,034,624 A * | 3/2000 | Goto | G01B 7/02 324/207.16 |
| 6,534,970 B1 | 3/2003 | Ely et al. | |
| 7,298,137 B2 * | 11/2007 | Howard | G01D 5/2093 324/207.17 |
| 8,129,985 B2 | 3/2012 | Lee et al. | |
| 2005/0030010 A1 * | 2/2005 | Jones | D06F 9/003 324/207.24 |
| 2011/0109303 A1 * | 5/2011 | Zhitomirsky | G01D 5/204 324/207.15 |
| 2014/0117980 A1 * | 5/2014 | Ely | G01B 7/30 324/207.17 |

* cited by examiner

*Primary Examiner* — Daniel Miller
*Assistant Examiner* — Nasima Monsur
(74) *Attorney, Agent, or Firm* — Cantor Colburn LLP

(57) ABSTRACT

A hardware-only contactless position sensor system is provided that includes a contactless position sensor and hardware-only sensor system electronics. The sensor includes excitation, sine, and cosine coils. The electronics are coupled to the sensor and detect a position of a target relative to the sensor. The electronics include a phase shift and summation circuit that applies a phase shift at a frequency of the excitation coil to one of a sine signal from the sine coil or a cosine signal from the cosine coil as a phase shifted signal and add the phase shifted signal with an unshifted instance of the cosine or sine signal to produce a phase shifted output. The electronics also include a phase detector circuit that detects a phase of the phase shifted output and generate an output voltage corresponding to the phase and proportional to the position of the target.

8 Claims, 4 Drawing Sheets

HARDWARE-ONLY CONTACTLESS POSITION SENSOR SYSTEM

CROSS-REFERENCE TO RELATED APPLICATIONS

This patent application claims priority to U.S. Provisional Application No. 61/894,086, filed Oct. 22, 2013, which is incorporated herein by reference in its entirety.

BACKGROUND OF THE INVENTION

The subject matter disclosed herein relates to position sensing. More specifically, the subject disclosure relates to a hardware-only contactless position sensor system.

Position sensors can be used to measure absolute position of linear and rotational motion. A position sensor can include sensing coils that are designed to detect relative position between a moving target and a fixed portion containing receive and excitation coils. Sensing systems are typically implemented using microprocessor based electronics with algorithms implemented using software code. Software-based designs add flexibility; however, there is a high initial cost of software design and development for certification in an aerospace environment. Software-based designs may also raise reliability concerns due to potential susceptibility to single event upsets. For example, in an aerospace environment, sensor systems typically have a greater level of exposure to high-energy particles at altitude. Thus, there is a need for a sensor system implemented as a hardware-only design rather than a software-based design.

BRIEF DESCRIPTION OF THE INVENTION

According to one aspect, a hardware-only contactless position sensor system is provided that includes a contactless position sensor and hardware-only sensor system electronics. The contactless position sensor includes an excitation coil, a sine coil, and a cosine coil. The hardware-only sensor system electronics are coupled to the contactless position sensor and detect a position of a target relative to the contactless position sensor. The hardware-only sensor system electronics include a phase shift and summation circuit that applies a phase shift at a frequency of the excitation coil to one of a sine signal from the sine coil or a cosine signal from the cosine coil as a phase shifted signal and adds the phase shifted signal with an unshifted instance of the cosine or sine signal to produce a phase shifted output. The hardware-only sensor system electronics also include a phase detector circuit that detects a phase of the phase shifted output and generates an output voltage corresponding to the phase and proportional to the position of the target relative to the contactless position sensor.

According to a further aspect, a method is provided for hardware-only contactless position sensing using a contactless position sensor that includes an excitation coil, a sine coil, and a cosine coil. A phase shift and summation circuit applies a phase shift at a frequency of the excitation coil to one of a sine signal from the sine coil or a cosine signal from the cosine coil as a phase shifted signal. The phase shift and summation circuit adds the phase shifted signal with an unshifted instance of the cosine or sine signal to produce a phase shifted output. A phase detector circuit detects a phase of the phase shifted output and generates an output voltage corresponding to the phase and proportional to a position of a target relative to the contactless position sensor.

DETAILED DESCRIPTION OF THE INVENTION

Exemplary embodiments provide a hardware-only contactless position sensor system. Using a hardware-only design mitigates potential issues associated with a software-based design, which can result in lower development and certification costs, as well as lower the risk of single event upset susceptibility.

Figure 1:
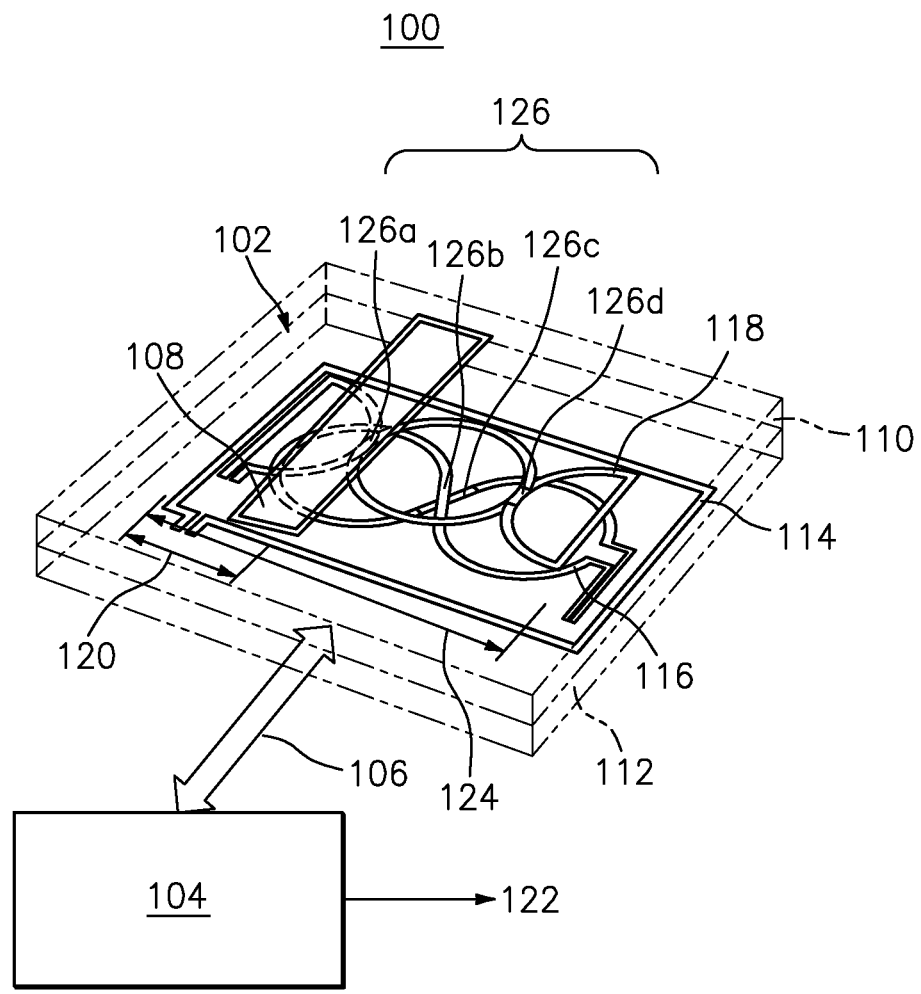
FIG. 1 depicts a hardware-only contactless position sensor system according to an embodiment.

FIG. 1 depicts a hardware-only contactless position sensor system 100 according to an embodiment. A contactless position sensor 102 is coupled to hardware-only sensor system electronics 104 by a plurality of signals 106. In exemplary embodiments, the hardware-only sensor system electronics 104 determine a position of a target 108 using electronics absent executable software. In the example of FIG. 1, the target 108 is disposed in a planar space 110 offset from the contactless position sensor 102 relative to a printed circuit board (PCB) 112. An excitation coil 114, a sine coil 116 and a cosine coil 118 are arranged on the PCB 112 with the excitation coil 114 forming a rectangular loop around the sine and cosine coils 116 and 118. The target 108 can be incorporated on a separate PCB relative to the PCB 112. A position 120 of the target 108 is determined by the hardware-only sensor system electronics 104 through mutual inductive coupling between the target 108 and the coils 114-118. The hardware-only sensor system electronics 104 translate the position 120 into an output voltage 122 representative of a linear relationship between the position 120 and a stroke length 124.

The contactless position sensor 102 may also include a plurality of fine coils 126, which are depicted as fine coil 126a, 126b, 126c, and 126d in the example of FIG. 1. The fine coils 126 can be used in conjunction with the sine coil 116 and cosine coil 118 to increase position determination accuracy. The sine coil 116 and cosine coil 118 can provide an indication as to which of the fine coils 126 to select for determining the position 120 of the target 108. Although four fine coils 126a-126d are depicted in the example of FIG. 1, a greater or lesser number of fine coils 126 can be incorporated in embodiments. Where a high level of accuracy is not critical, the fine coils 126 can be omitted. Further, although the contactless position sensor 102 is depicted in FIG. 1 as a linear position sensor, rotary position sensors can also be supported in embodiments using the techniques as described herein.

Figure 2:
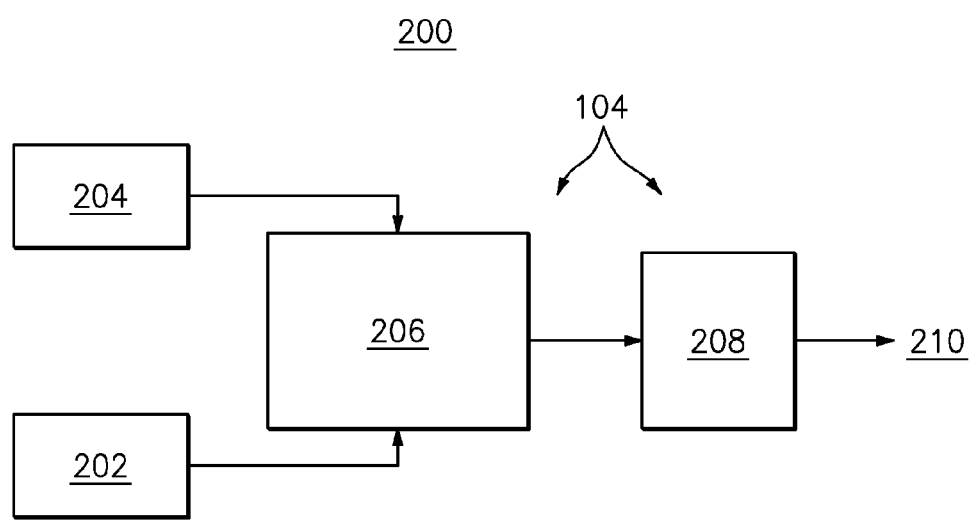
FIG. 2 depicts a high-level block diagram of hardware-only sensor system electronics according to an embodiment.

FIG. 2 depicts a high-level block diagram 200 of the hardware-only sensor system electronics 104 of FIG. 1 according to an embodiment. A sine signal 202 is received from the sine coil 116 of FIG. 1 at the hardware-only sensor system electronics 104 of FIG. 1. A cosine signal 204 is received from the cosine coil 118 of FIG. 1 at the hardware-only sensor system electronics 104 of FIG. 1. The sine and cosine signals 202 and 204 provide an amplitude modulated (AM) output in relation to the position 120 of the target 108 of FIG. 1 according to equations 1 and 2, where V is voltage, A is amplitude, x is position 120 of FIG. 1, ω is a carrier frequency, and t is time. The carrier frequency (ω) is also referred to as the frequency (ω) of the excitation coil 114.

$$V_{sin} = A \sin(x)\sin(\omega t) \quad \text{(eq. 1)}$$

$$V_{cos} = A \cos(x)\sin(\omega t) \quad \text{(eq. 2)}$$

A phase shift and summation circuit 206 can apply a phase shift of 90 degrees to either the sine signal 202 or the cosine signal 204 at the carrier frequency (ω) such that they are aligned. The phase shifted and unshifted signals of the sine and cosine signals 202 and 204 are added to a signal at the carrier frequency (ω) with a phase proportional to the relative displacement of the target 108 of FIG. 1. The phase shift is relative to the carrier frequency (ω), which enables detection of a phase attributable to the position 120 of FIG. 1. This results in equation 3.

$$V_{out} = A \cos(\omega t - x) \quad \text{(eq. 3)}$$

Accordingly, measurement of the phase of the output signal relative to a reference signal of the carrier frequency (ω) determines the value of x or the position 120 of the target 108 of FIG. 1. A phase detector circuit 208 detects a phase of the phase shifted output from the phase shift and summation circuit 206 as an output voltage 210, which is proportional the position 120 of the target 108 of FIG. 1. The output voltage 210 may be equivalent to the output voltage 122 of FIG. 1, or the output voltage 210 may be further processed before determining the output voltage 122 of FIG. 1. The phase shift and summation circuit 206 and the phase detector circuit 208 are implemented in hardware-only electronic circuitry without the use of a processor or lookup table. Using a phase-distance relationship rather than traditional amplitude measurements of AM systems can improve accuracy by reducing susceptibility to noise and increasing dynamic range. The phase is proportional to relative displacement of the target 108 of FIG. 1. Accordingly, this unique circuit converts the amplitude modulation (AM) of the carrier signal due to the target displacement to a phase modulation (PM).

Figure 3:
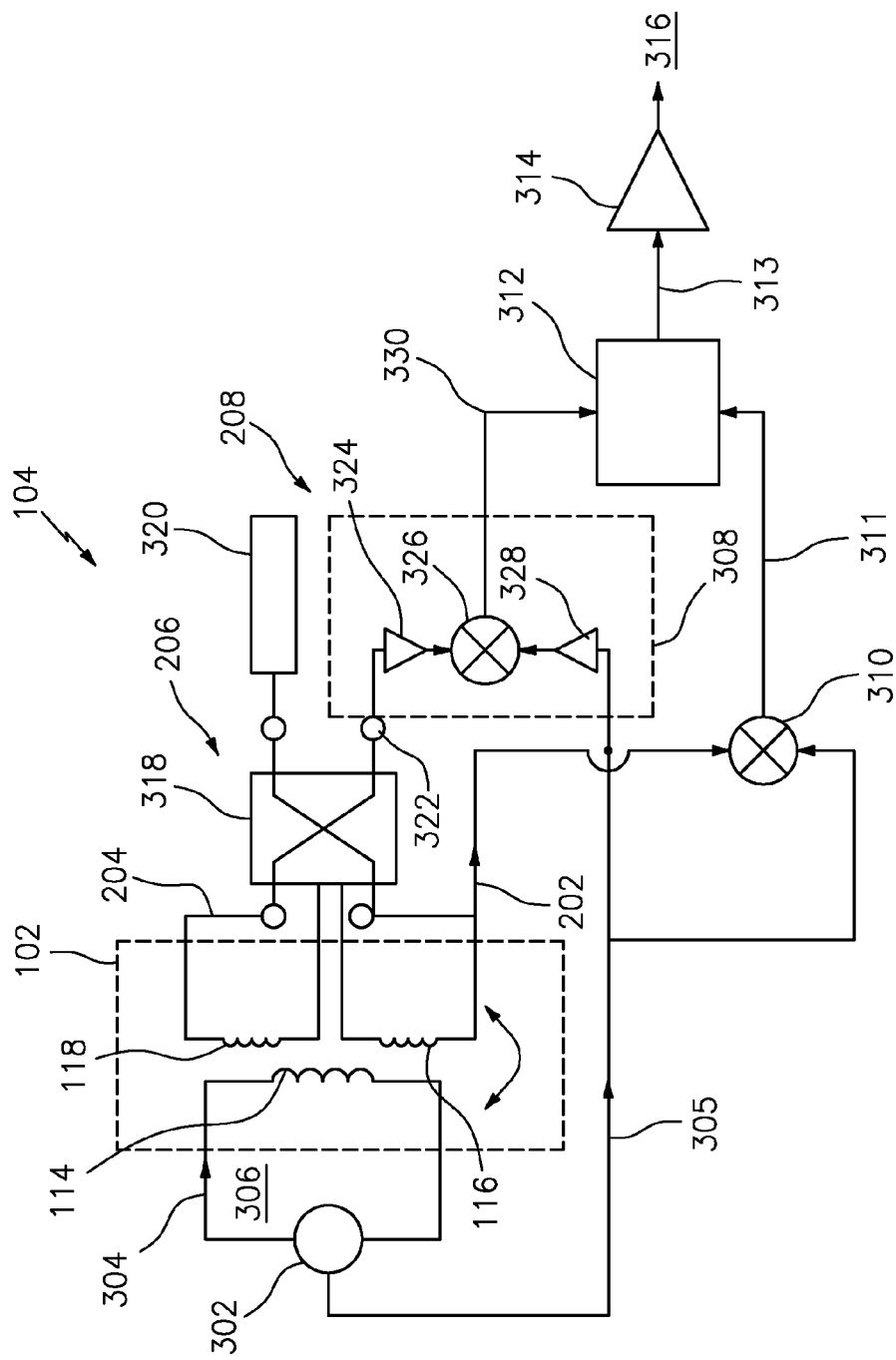
FIG. 3 depicts a detailed example of hardware-only sensor system electronics according to an embodiment.

FIG. 3 is a detailed example of the hardware-only sensor system electronics 104 of FIG. 1 according to an embodiment. An oscillator 302 drives an excitation signal 304 at a carrier frequency (ω) 306 to the excitation coil 114 of FIG. 1 and a reference excitation signal 305 to a phase detector circuit 308. The phase detector circuit 308 is an embodiment of the phase detector circuit 208 of FIG. 2. The reference excitation signal 305 also drives to a mixer 310. The mixer 310 may also receive the sine signal 202 of FIG. 2 from the sine coil 116 of the contactless position sensor 102 of FIG. 1. In the example of FIG. 3, the mixer 310 is a double balanced mixer that establishes a phase polarity 311 for a phase conditioning circuit 312. The phase conditioning circuit 312 is coupled to the phase detector circuit 308 to ensure that phase polarity 311 is properly handled for a range of about 360 degrees. A conditioned phase 313 is output from the phase conditioning circuit 312 as a voltage and may be further amplified by a precision scaling amplifier 314 to produce an output voltage 316. The output voltage 316 may be equivalent to the output voltage 122 of FIG. 1, or the output voltage 316 may be further processed before determining the output voltage 122 of FIG. 1.

The sine coil 116 and the cosine coil 118 of the contactless position sensor 102 of FIG. 1 are coupled to a coupler 318. The coupler 318 may also be coupled to a termination resistor, e.g., a 50 ohm resistor, and to the phase detector circuit 308. The coupler 318 is an embodiment of the phase shift and summation circuit 206 of FIG. 2. The coupler 318 is a 90 degree coupler that can add a phase shift of about 90 degrees to either the sine signal 202 or the cosine signal 204 and produce a phase shifted output 322. The phase detector circuit 308 receives the phase shifted output 322 and amplifies it using a limiting amplifier 324 to mix at mixer 326 with the reference excitation signal 305 amplified using a limiting amplifier 328. The limiting amplifiers 324 and 328 provide a constant signal input to the mixer 326. Output voltage 330 of the phase detector circuit 308 is fed to the phase conditioning circuit 312 for further phase correction as previously described.

Although FIG. 3 depicts one example of hardware-only elements that can be included in the hardware-only sensor system electronics 104 of FIG. 1, it will be understood that different hardware-only variations can be implemented absent executable software. Additionally, various elements can be combined or further subdivided within the scope of embodiments.

Figure 4:
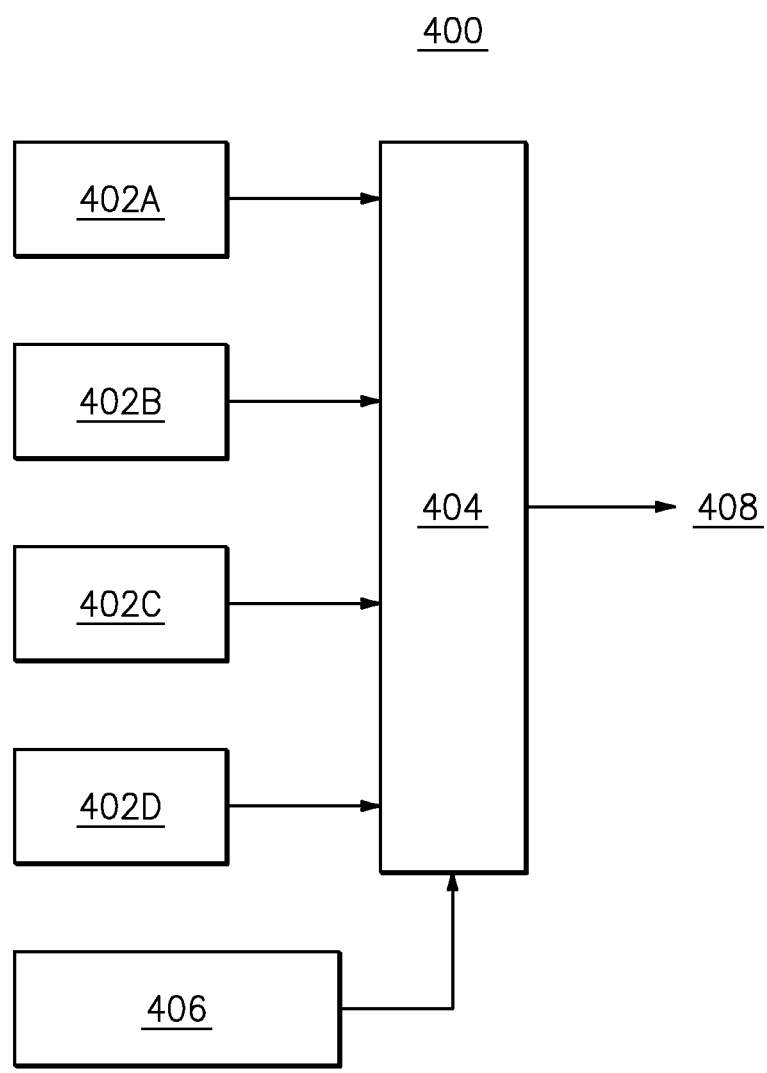
FIG. 4 depicts a block diagram of a fine coil phase selector according to an embodiment.

FIG. 4 depicts a block diagram of a fine coil phase selector 400 according to an embodiment. When the fine coils 126 of FIG. 1 are included, they can be handled similar to the sine and cosine coils 116 and 118 to produce phase values. For example, multiple instances of the phase shift and summation circuit 206 and the phase detector circuit 208 of FIG. 2 can be implemented to produce local fine coil phase values 402a, 402b, 402c, and 402d for the fine coils 126a, 126b, 126c, and 126d of FIG. 1. The local fine coil phase values 402a-402d can provide a precise phase value over a relatively narrow range. Accordingly, a phase 406 determined from the sine and cosine coils 116 and 118 is passed to a selector 404 and used to select which of the local fine coil phase values 402a-402d is closest to the phase 406, or in other words, which of the fine coils 126 of FIG. 1 is positioned closest to the position 120 of the target 108 of FIG. 1. The phase 406 may be equivalent to or a rescaled version of the conditioned phase 313 or output voltage 330 of FIG. 3. An output voltage 408 from the selector 404 may be the output voltage 122 of FIG. 1, representing a final phase value. The selector 404 may be implemented using a combination of comparators (not depicted).

Referring to FIGS. 1-4, a method of hardware-only contactless position sensing using the contactless position sensor 102 includes applying, by a phase shift and summation circuit 206, a phase shift at the carrier frequency (ω) 306 of the excitation coil 114 to one of the sine signal 202 from the sine coil 116 or the cosine signal 204 from the cosine coil 118 as a phase shifted signal. The method also includes adding, by the phase shift and summation circuit 206, the phase shifted signal with an unshifted instance of the cosine signal 204 or sine signal 202 to produce the phase shifted output 322. The method further includes detecting, by the phase detector circuit 208, a phase of the phase shifted output 322. The method additionally includes generating, by the phase detector circuit 208, an output voltage 316 corresponding to the phase and proportional to the position 120 of the target 108 relative to the contactless position sensor 102. In an embodiment, the phase shift is about 90 degrees at the carrier frequency (ω) 306. A phase polarity 311 can be determined based on the reference excitation signal 305 and at least one of the sine signal 202 or the cosine signal 204. The phase can be adjusted based on the phase polarity 311 as the conditioned phase 313. The method can also include determining phases 402a-402d of the fine coils 126a-126d and selecting one of the phases 402a-402d to output based on the phase 406 determined from the sine coil 116 and the cosine coil 118. Selection of one of the phases 402a-402d of the fine coils 126a-126d to output can be based on determining which of the fine coils 126a-126d is positioned closest to the position 120 of the target 108.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A hardware-only contactless position sensor system, comprising:
    a contactless position sensor on a printed circuit board comprising an excitation coil, a sine coil, a cosine coil, and a plurality of fine coils located between the sine coil and the cosine coil, wherein the excitation coil forms a rectangular loop around the sine coil, the cosine coil, and the fine coils; and
    hardware-only sensor system electronics coupled to the contactless position sensor, the hardware-only sensor system electronics detect a position of a target relative to the contactless position sensor, the hardware-only sensor system electronics comprising:
        a phase shift and summation circuit that applies a phase shift at a frequency of the excitation coil to one of a sine signal from the sine coil or a cosine signal from the cosine coil as a phase shifted signal and add the phase shifted signal with an unshifted instance of the cosine or sine signal to produce a phase shifted output;
        a phase detector circuit that detects a phase of the phase shifted output and generate an output voltage corresponding to the phase and proportional to the position of the target relative to the contactless position sensor;
        a phase conditioning circuit coupled to the phase detector circuit, wherein the phase conditioning circuit applies a phase correction to the output voltage; and
        a double balanced mixer coupled to the phase conditioning circuit, wherein the double balanced mixer establishes a phase polarity for the phase conditioning circuit.

2. The hardware-only contactless position sensor system of claim 1, wherein the phase shift is 90 degrees.

3. The hardware-only contactless position sensor system of claim 1, wherein the target is offset in a planar space relative to the printed circuit board of the contactless position sensor.

4. The hardware-only contactless position sensor system of claim 1, wherein the phase shift and summation circuit is a 90 degree coupler connecting the sine coil and the cosine coil to the phase detector.

5. The hardware-only contactless position sensor system of claim 1, wherein the hardware-only sensor system electronics determine phases of the fine coils and select one of the phases to output based on the phase determined from the sine coil and the cosine coil.

6. A method for hardware-only contactless position sensing using a contactless position sensor on a printed circuit board comprising an excitation coil, a sine coil, a cosine coil, and a plurality of fine coils located between the sine coil and the cosine coil, wherein the excitation coil forms a rectangular loop around the sine coil, the cosine coil, and the fine coils, the method comprising:
    applying, by a phase shift and summation circuit, a phase shift at a frequency of the excitation coil to one of a sine signal from the sine coil or a cosine signal from the cosine coil as a phase shifted signal;
    adding, by the phase shift and summation circuit, the phase shifted signal with an unshifted instance of the cosine or sine signal to produce a phase shifted output;
    detecting, by a phase detector circuit, a phase of the phase shifted output;
    determining phases of the fine coils;
    selecting one of the phases to output based on the phase determined from the sine coil and the cosine coil;
    generating, by the phase detector circuit, an output voltage corresponding to the selected phase and proportional to a position of a target relative to the contactless position sensor;
    determining, by a double balanced mixer, a phase polarity based on a reference excitation signal and at least one of the sine signal or the cosine signal; and
    applying, by a phase conditioning circuit, a phase correction to the output voltage based on the phase polarity.

7. The method of claim 6, wherein the phase shift is 90 degrees.

8. The method of claim 6, wherein selection of one of the phases of the fine coils to output is based on determining which of the fine coils is positioned closest to the position of the target.

* * * * *